US011168644B2

(12) United States Patent
Presseq et al.

(10) Patent No.: US 11,168,644 B2
(45) Date of Patent: Nov. 9, 2021

(54) JET ENGINE COMPRISING A NACELLE EQUIPPED WITH A REVERSER SYSTEM COMPRISING INNER DOORS AND OUTER FLAPS

(71) Applicant: Airbus Operations (S.A.S.), Toulouse (FR)

(72) Inventors: Laurent Presseq, Toulouse (FR); Julie Cazalis, Tournefeuille (FR); Lionel Sillieres, Samatan (FR); Bastian Sabathier, Fonsorbes (FR); José Goncalves, Colomiers (FR); Frédéric Piard, Tournefeuille (FR); Lionel Czapla, Cornebarrieu (FR); Thierry Gaches, Castelnau d'estretefonds (FR); Frédéric Ridray, L'isle Jourdain (FR); Pascal Gardes, Levignac (FR)

(73) Assignee: Airbus Operations (S.A.S.), Toulouse (FR)

(*) Notice: Subject to any disclaimer, the term of this patent is extended or adjusted under 35 U.S.C. 154(b) by 69 days.

(21) Appl. No.: 16/556,872

(22) Filed: Aug. 30, 2019

(65) Prior Publication Data
US 2020/0080513 A1 Mar. 12, 2020

(30) Foreign Application Priority Data
Sep. 6, 2018 (FR) .................................. 1858011

(51) Int. Cl.
*F02K 1/72* (2006.01)
*F02K 1/76* (2006.01)
(Continued)

(52) U.S. Cl.
CPC ................ *F02K 1/72* (2013.01); *B64D 29/06* (2013.01); *F02K 1/763* (2013.01); *F02K 1/09* (2013.01);
(Continued)

(58) Field of Classification Search
CPC ....................................................... F02K 1/563
See application file for complete search history.

(56) References Cited

U.S. PATENT DOCUMENTS 3,690,561 A * 9/1972 Potter .................... F02K 1/563
239/265.29
3,815,357 A * 6/1974 Brennan ................... F02K 1/70
60/226.2
(Continued)

FOREIGN PATENT DOCUMENTS

| EP | 3 029 306 A1 | 6/2016 |
| EP | 3 103 995 A2 | 12/2016 |
| FR | 2 887 225 A1 | 12/2006 |

OTHER PUBLICATIONS

French Search Report for Application No. 1858011 dated May 13, 2019.

*Primary Examiner* — Craig Kim
*Assistant Examiner* — Stephanie Sebasco Cheng
(74) *Attorney, Agent, or Firm* — Jenkins, Wilson, Taylor & Hunt, P.A.

(57) ABSTRACT

A turbofan including a motor, nacelle and a secondary duct therebetween. The nacelle includes a fan casing with front and rear parts, a fixed assembly including a fixed structure and the front part, a mobile assembly with an openwork frame, a mobile cowl and the rear part and mobile between advanced and retracted positions in which a window is open between the secondary duct and the exterior of the nacelle, inner doors articulated between stowed and deployed positions, a first actuator for moving the frame and a second actuator for moving each inner door. The rear part is divided into outer flaps mobile between lowered and raised positions and is moved by an electric motor. A jet engine accordingly serves to increase retraction distance by freeing up part of
(Continued)

the fan cowl and improve orientation of flow of air passing through the window by orienting the outer flaps.

3 Claims, 3 Drawing Sheets

(51) Int. Cl.
  *B64D 29/06*    (2006.01)
  *F02K 1/09*     (2006.01)
(52) U.S. Cl.
  CPC .. *F05D 2240/128* (2013.01); *F05D 2260/901* (2013.01)

(56) References Cited

U.S. PATENT DOCUMENTS

| | | | | |
|---|---|---|---|---|
| 4,137,711 | A * | 2/1979 | Montgomery | F02K 1/72 60/226.2 |
| 8,151,551 | B2 * | 4/2012 | Pero | F02K 1/70 60/226.2 |
| 2014/0110503 | A1 * | 4/2014 | Teulou | F02K 1/70 239/265.19 |
| 2016/0363097 | A1 * | 12/2016 | Foutch | F02K 1/70 |
| 2018/0313297 | A1 * | 11/2018 | Surply | F02K 1/72 |
| 2019/0178206 | A1 * | 6/2019 | Ridray | B64D 29/02 |
| 2019/0257269 | A1 * | 8/2019 | Rambaud | B64D 29/06 |

\* cited by examiner

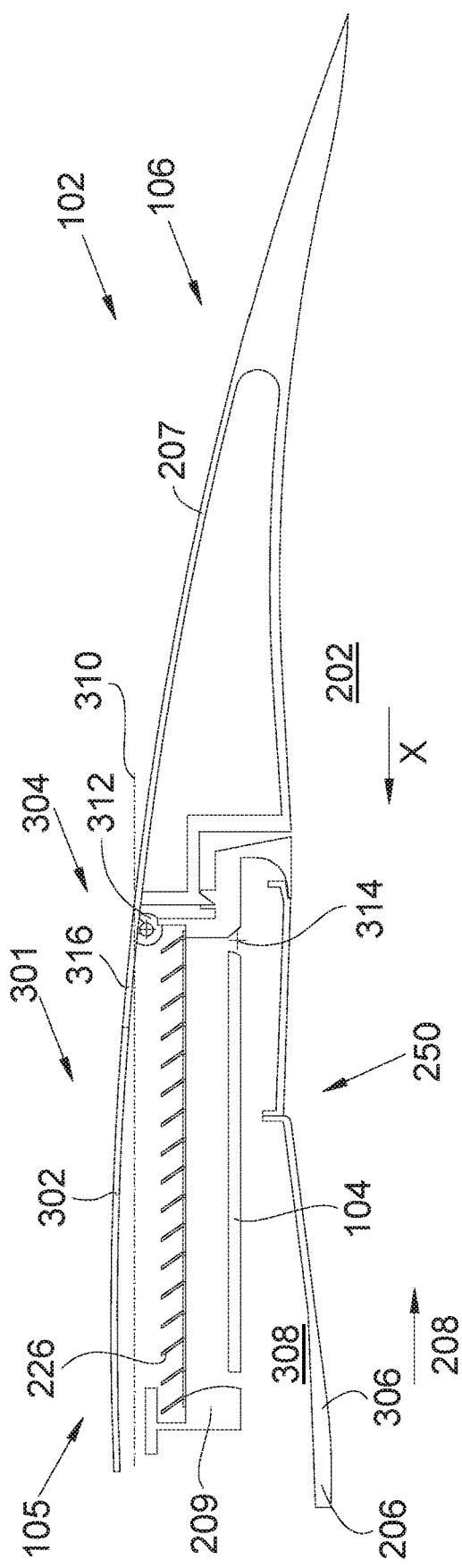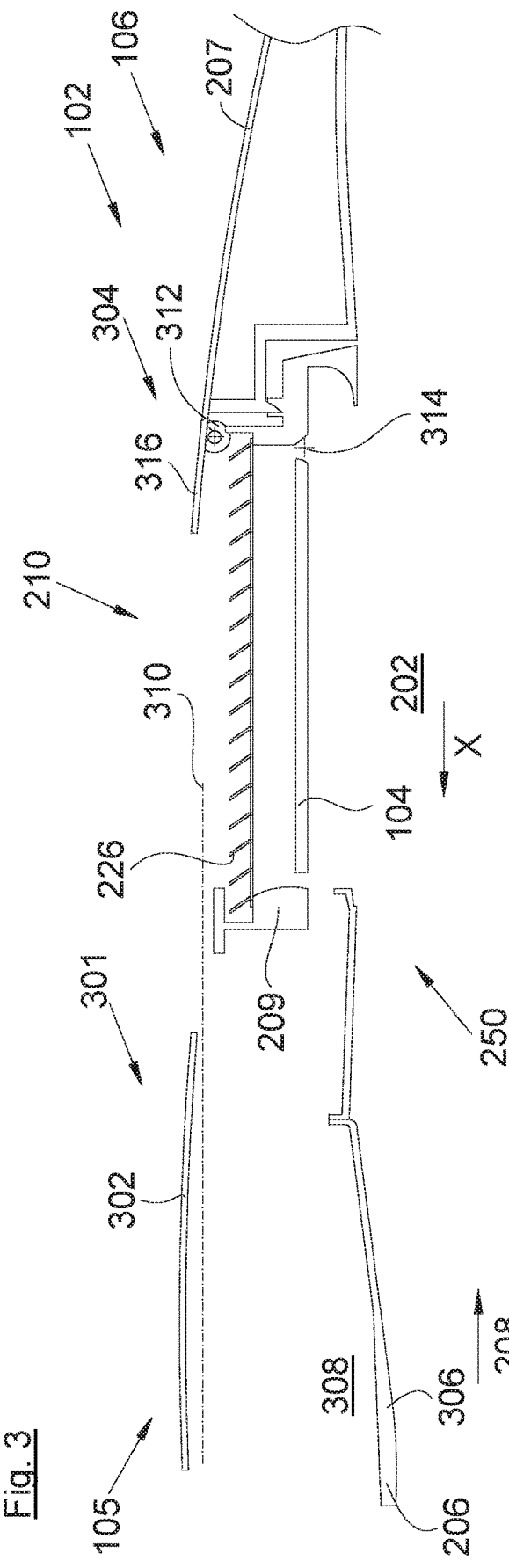
Fig. 3
Fig. 4

JET ENGINE COMPRISING A NACELLE EQUIPPED WITH A REVERSER SYSTEM COMPRISING INNER DOORS AND OUTER FLAPS

CROSS-REFERENCE TO RELATED APPLICATION

This application claims the benefit of and priority to French patent application number 18 58011 filed on Sep. 6, 2018, the entire disclosure of which is incorporated by reference herein.

TECHNICAL FIELD

The disclosure herein relates to a turbofan which comprises a nacelle equipped with a reverser system comprising inner doors and outer flaps, and to an aircraft comprising at least one such turbofan.

BACKGROUND

An aircraft includes a fuselage to each side of which is fixed a wing. Under each wing is suspended at least one turbofan which consists, from front to rear, of an air intake, a fan, a motor core and an exhaust nozzle. The air drawn in by the fan enters via the air intake and splits into a primary flow which passes through the motor core and a secondary flow which flows around the motor core in a secondary duct provided for that purpose. The two flows meet before being ejected through the exhaust nozzle.

Each turbofan is fixed under the wing by a pylon that is fixed between the structure of the wing and the structure of the turbofan.

The turbofan comprises the motor core and a nacelle which is attached around the motor so as to delimit, between them, the secondary duct and so as to form the fan cowl.

The nacelle comprises a fixed assembly which is arranged at the front and which includes in particular the fan cowl and a mobile assembly which is arranged at the rear of the fixed assembly and which is mobile in translation from an advanced position in which the mobile assembly adjoins the fixed assembly and a retracted position in which the mobile assembly is retracted relative to the fixed assembly so as to open a window between them, this window being open between the secondary duct and the exterior of the nacelle.

The nacelle comprises a reversal system which comprises a plurality of inner doors secured to the front of the mobile assembly, each one being mobile between a stowed position in which it is not across the secondary duct and a deployed position in which it is positioned across the secondary duct so as to direct the secondary flow to the window which is opened up by the retraction of the mobile assembly.

Because of the increase in internal dimensions of the jet engine, the volume necessary for moving the mobile assembly is reduced, and this can reduce the retraction distance of the mobile assembly and consequently the dimensions of the window. It is therefore advantageous to find a jet engine of which the nacelle is configured so as to permit better retraction of the mobile assembly.

SUMMARY

One object of the disclosure herein is a turbofan which comprises a nacelle equipped with a reversal system having a plurality of inner doors and outer flaps, and which permits a greater retraction distance for the mobile assembly.

To that end, the disclosure herein proposes a turbofan comprising a motor and a nacelle, surrounding the motor, and in which a secondary duct for a secondary flow is delimited between the nacelle and the motor, the nacelle comprising:

a fan casing comprising a front part and a rear part, a fixed assembly arranged at the front and comprising a fixed structure and the front part, a mobile assembly arranged at the rear of the fixed assembly and comprising a frame having openwork regions, a mobile cowl attached to the frame and the rear part mounted at the front of the mobile cowl, the mobile assembly being mobile in translation on the fixed structure in a direction of translation between an advanced position in which the mobile assembly is positioned such that the rear part is moved close to and extends the front part, and a retracted position in which the mobile assembly is positioned such that the rear part is moved away to the rear of the front part so as to define between them a window that is open between the secondary duct and the exterior of the nacelle, a plurality of inner doors mounted articulated along a rear edge on the frame between a stowed position and a deployed position, where, in the stowed position, each inner door closes an openwork region of the frame and, in the deployed position, each inner door extends across the secondary duct, a first actuator provided for the purpose of moving the frame in translation from the advanced position to the retracted position and vice versa, and a second actuator provided for the purpose of moving each inner door from the stowed position to the deployed position and vice versa, where the rear part is divided into multiple outer flaps where each is mounted articulated by its rear edge to the frame and is mobile between a lowered position in which each outer flap is aligned with the mobile cowl and extends facing a rear part of the openwork region of the frame and a raised position in which each outer flap is tilted so as to extend its front edge outwards and to free the rear part of the openwork region of the frame, and where the nacelle further comprises, for each outer flap, an electric motor provided for the purpose of moving the outer flap from the lowered position to the raised position and vice versa.

A jet engine of this kind serves to increase the retraction distance by freeing up part of the fan cowl, and to improve the orientation of the flow of air passing through the window by orienting the outer flaps.

Advantageously, the turbofan comprises at least one deflector attached to the frame and arranged across the openwork region of the frame.

The subject matter herein also discloses an aircraft comprising at least one turbofan in accordance with one of the above variants.

BRIEF DESCRIPTION OF THE DRAWINGS

The abovementioned features of the disclosure herein, along with others, will become more clearly apparent on reading the following description of one exemplary embodiment, the description being given with reference to the appended drawings, in which:

FIG. 3 is a schematic sectional representation of a turbofan according to the disclosure herein in the advanced and stowed position;

FIG. 4 is a representation similar to that of FIG. 3, for an intermediate position corresponding to a retracted and stowed position.

DETAILED DESCRIPTION

In the following description, the terms relating to a position are considered with reference to the direction of advance of the aircraft.

Figure 1:
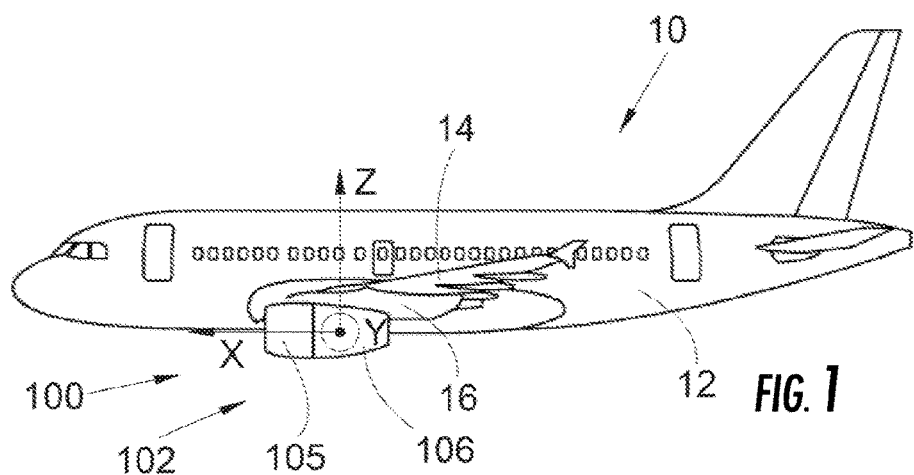
FIG. 1 is a side view of an aircraft comprising a turbofan according to the disclosure herein.

FIG. 1 shows an aircraft 10 that comprises a fuselage 12, to each side of which is fixed a wing 14 that bears at least one turbofan 100 according to the disclosure herein. The turbofan 100 is fixed under the wing 14 by a pylon 16.

The turbofan 100 has a nacelle 102 and a motor which is housed inside the nacelle 102 in the form of a motor core, and where a secondary duct is delimited between the motor core and the nacelle 102.

The nacelle 102 comprises a fixed assembly 105 which is arranged at the front and which includes in particular a front part of the fan cowl and a mobile assembly 106 which is arranged at the rear of the fixed assembly 105 and which is mobile in translation between an advanced position in which the mobile assembly 106 adjoins the fixed assembly 105 and a retracted position in which the mobile assembly 106 is retracted relative to the fixed assembly 105 so as to open a window between them, this window being open between the secondary duct and the exterior of the nacelle 102.

In the following description, and by convention, X denotes the longitudinal axis of the turbofan 100 that is parallel to the longitudinal axis of the aircraft 10 oriented positively towards the front of the aircraft 10, Y denotes the transverse axis which is horizontal when the aircraft is on the ground, and Z denotes the vertical axis, these three directions X, Y and Z being mutually orthogonal.

Figure 2:
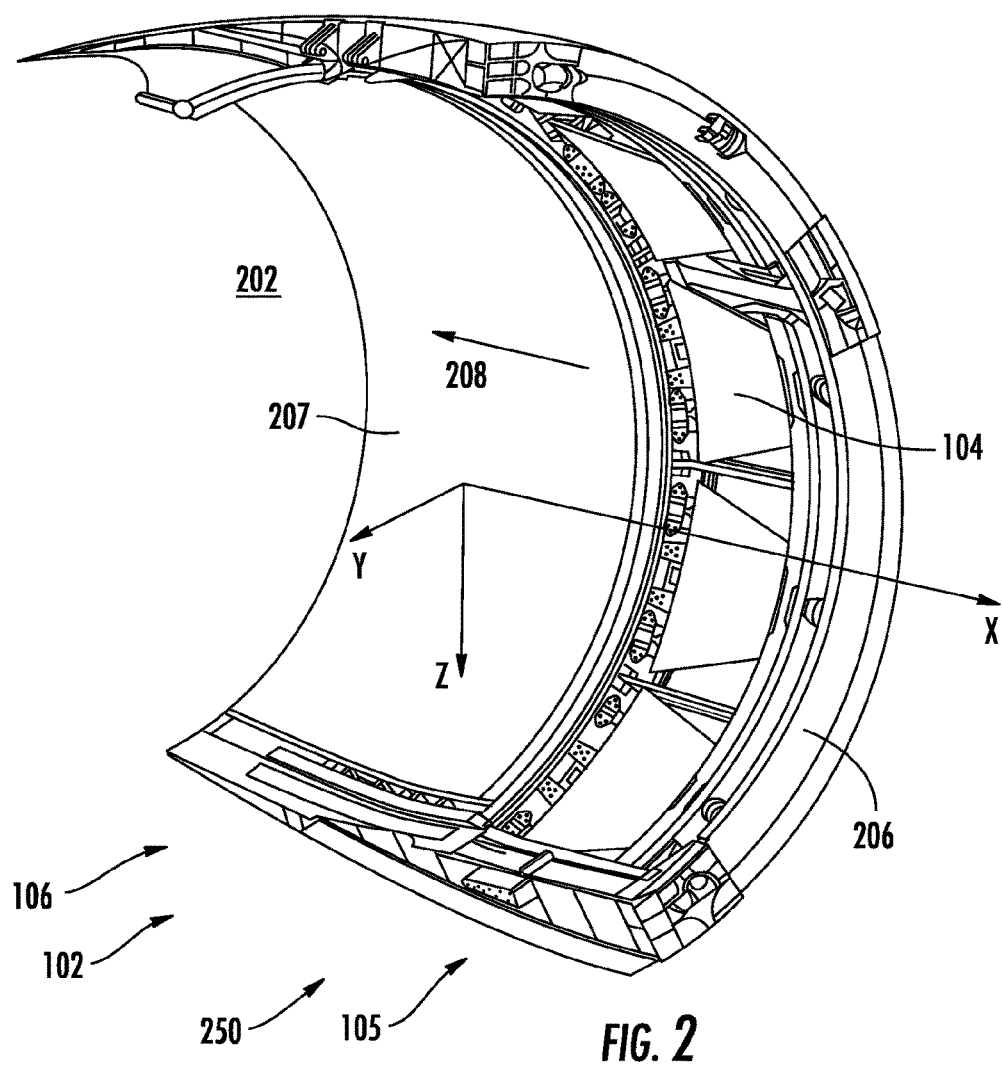
FIG. 2 is a perspective view from the interior of a part of a nacelle of the turbofan according to the disclosure herein.
Figure 5:
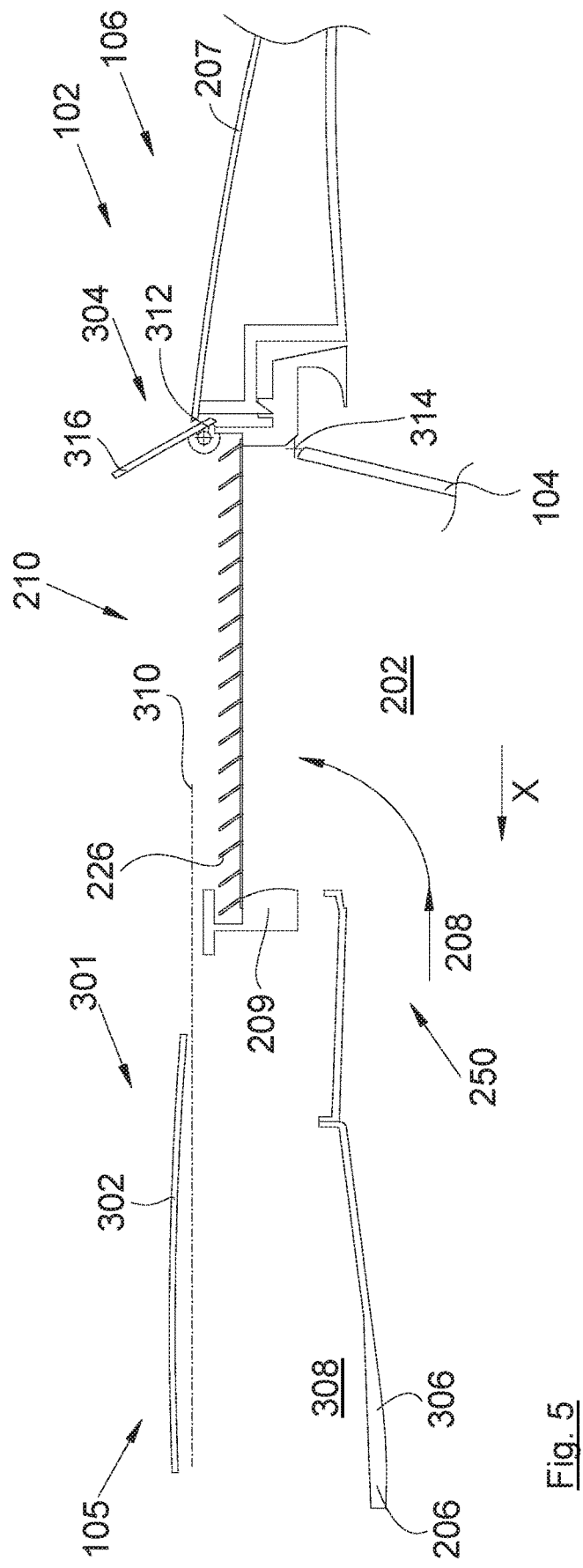
FIG. 5 is a representation similar to that of FIG. 3, for a retracted and deployed position.

FIG. 2 shows a part of the nacelle 102 and FIGS. 3 to 5 show various positions of a reverser system 250 of the nacelle 102.

The turbofan 100 has, between the nacelle 102 and the motor, the secondary duct 202 in which flows the secondary flow 208 coming from the air intake and through the fan, and which therefore flows in the flow direction from forward to rear of the nacelle 102.

The fixed assembly 105 has a fixed structure 206 which is mounted fixed on the front part 302 of a fan casing 301.

The mobile assembly 106 comprises a mobile cowl 207 forming the outer walls of the nozzle and a frame 209 around the motor. In this case, the frame 209 is in the form of a cylinder having openwork regions. The mobile cowl 207 is fixed to and at the rear of the frame 209.

The mobile assembly 106 comprises a rear part 304 of the fan casing 301 which forms a skirt and extends the front part 302 of the fan casing 301. The rear part 304 is mounted at the front of the mobile cowl 207. The outer surface of the fan casing 301 narrows when progressing from front to rear so as to align itself with the mobile cowl 207.

The mobile assembly 106, via the intermediary of the frame 209, is mounted mobile in translation in a translation direction globally parallel to the longitudinal axis X on the fixed structure 206 of the nacelle 102.

The mobile assembly 106, and therefore the frame 209, is mobile between an advanced position (FIG. 3) and a retracted position (FIGS. 4 and 5) and vice versa. In the advanced position, the mobile assembly 106, and therefore the frame 209, is positioned as far forward as possible with respect to the longitudinal axis X such that the rear part 304 of the fan casing 301 is moved close to and extends the front part 302 of the fan casing 301. Thus, from front to rear, the front part 302, the rear part 304 and the mobile cowl 207 extend one another so as to define an aerodynamic outer surface. In the retracted position, the mobile assembly 106, and therefore the frame 209, is positioned as far aft as possible with respect to the longitudinal axis X such that the rear part 304 of the fan casing 301 is moved away to the rear of the front part 302 of the fan casing 301.

In the retracted position, the rear part 304 of the fan casing 301 and the front part 302 of the fan casing 301 are spaced apart from one another and define, between them, the window 210 that is open between the secondary duct 202 and the exterior of the nacelle 102. That is to say that the air from the secondary flow 208 passes through the window 210 to end up outside the turbofan 100.

The window 210 is formed by the openwork regions provided in the frame 209.

The front part 302 forms the front boundary of the window 210 with respect to the longitudinal axis X, and the rear part 304 forms the rear boundary of the window 210 with respect to the longitudinal axis X.

The translation of the frame 209, and therefore of the mobile assembly 106, is brought about by any appropriate slideway system, such as slideways between the fixed structure 206 and the frame 209. The mobile assembly 106 is made to move by any appropriate type of actuator controlled by a control unit, for example of the processor type, which orders the displacements in one direction or the other depending on the requirements of the aircraft 10. Each actuator may for example take the form of an electric ball jack or any other appropriate type of jack.

The mobile assembly 106 comprises a plurality of inner doors 104 distributed in the interior of the nacelle 102 around the motor and over the periphery as a function of the angular opening of the window 210 about the longitudinal axis X.

Each inner door 104 is mounted articulated on the frame 209 between a stowed position (FIGS. 3 and 4) and a deployed position (FIG. 5) and vice versa. Passage from the stowed position to the deployed position is brought about by rotation of the inner door 104 towards the interior of the jet engine 100. Articulation is along a rear edge of the inner door 104 while the front edge of the inner door 104 is free to move.

The stowed position of the inner doors 104 can be adopted when the frame 209 is in the advanced position or the retracted position. The deployed position of the inner doors 104 can be adopted only when the frame 209 is in the retracted position.

In the stowed position, each inner door 104 closes an openwork region of the frame 209 when the latter is in the advanced position and in the retracted position. In the deployed position, the inner door 104 extends towards the motor, that is to say across the secondary duct 202, and does not close the openwork region of the frame 209, opening up the window 210 and allowing the secondary flow 208 to pass through. In the deployed position, the inner door 104 serves to orient the secondary flow 208 so as to generate reverse thrust.

In the embodiment of the disclosure herein shown in FIGS. 3 through 5, in order to even better control the secondary flow 208 leaving the window 210, the nacelle 102 comprises at least one deflector 226 (in the case of there being more than one of these, this is then referred to as a cascade) which is fixed to the frame 209 and arranged across the openwork region of the frame 209.

The fixed structure 206 comprises an inner wall 306 which forms the outer wall of the secondary duct 202 and therefore extends inside the front part 302.

The front part 302 and the inner wall 306 define, between them, a compartment 308 in which the frame 209 and the inner doors 104 are housed when the mobile assembly 106 is in the advanced position. In the retracted position, the frame 209 and the inner doors 104 leave the compartment 308.

The reduced space inside the compartment 308 and the fact that the fan casing 301 narrows towards the rear might hamper the movement of the frame 209. The line 310 indicates the limit of the space requirement of the frame 209.

In order to avoid interaction between the fan casing 301 and the frame 209 when the latter moves, the front end of the rear part 304 is positioned beyond the frame 209 in the outward direction, that is to say outside the space requirement line 310. Thus, as it moves, the frame 209 is not hampered by the fan casing 301, and it can retract over a greater distance.

The rear part 304 is divided into multiple outer flaps 316, where each is mounted articulated by its rear edge to the frame 209 and is mobile between a lowered position (FIGS. 3 and 4) and a raised position (FIG. 5). In the lowered position, each outer flap 316 is aligned with the mobile cowl 207 and the front part 302 so as to create an aerodynamic surface and each outer flap 316 extends facing the rear part of the openwork region of the frame 209, and thus the window 210, and outside relative to these. In the raised position, each outer flap 316 is tilted so as to extend its front edge outwards and thus free the rear part of the openwork region of the frame 209. The front edge of each outer flap 316 is positioned to the front in the lowered position and outwards in the raised position.

The lowered position of the outer flaps 316 can be adopted when the frame 209 is in the advanced position or in the retracted position, and the raised position can be adopted only when the frame 209 is in the retracted position.

Moreover, the outer flaps 316 serve to improve the forward orientation of the secondary flow 208 as it leaves the window 210 since, when the inner doors 104 and the outer flaps 316 are deployed, they are generally continuous with one another.

Each outer flap 316 is moved between its lowered position and its raised position and vice versa by an electric motor 312 controlled by the control unit depending on requirements.

Each inner door 104 is articulated by its rear edge to the frame 209 on hinges 314, while the opposite front edge is free and is positioned towards the front in the stowed position and towards the motor in the deployed position.

The movement of each inner door 104 from the stowed position to the deployed position and vice versa is brought about by any appropriate actuator such as jacks or motors and controlled by the control unit.

According to another embodiment, the electric motor 312 is absent, and the movement of the outer flap 316 from the lowered position to the raised position is combined mechanically with the movement of the inner door 104.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A turbofan comprising a motor, a nacelle surrounding the motor, and in which a secondary duct for a secondary flow is between the nacelle and the motor, the nacelle comprising:
    a fan casing comprising a front part and a rear part;
    a front of the nacelle including a fixed assembly comprising a fixed structure and the front part of the fan casing;
    a mobile assembly rearward of the fixed assembly and comprising a frame having openwork regions, a mobile cowl attached to the frame, and the rear part of the fan casing mounted to the frame in front of the mobile cowl, the mobile assembly being mobile in translation on the fixed structure in a direction of translation between an advanced positions in which the mobile assembly is positioned such that the rear part of the fan casing is adjacent to and acts as an extension for the front part of the fan casing, and a retracted position, in which the mobile assembly is positioned such that the rear part of the fan casing is moved alt, away from the front part of the fan casing, to define between them a window that is open between the secondary duct and an exterior of the nacelle;
    a plurality of inner doors, each inner door being mounted articulated along a rear edge of the inner door on the frame between a stowed position and a deployed position, where, in the stowed position, each inner door closes one of the openwork regions of the frame and, in the deployed position, each inner door extends across the secondary duct;
    a first actuator for moving the frame in translation from the advanced position to the retracted position and vice versa; and
    a second actuator for moving each inner door from the stowed position to the deployed position and vice versa;
    the rear part of the fan casing being divided into multiple outer flaps, each of which is mounted articulated by its rear edge to the frame and is mobile between a lowered position, in which each outer flap is aligned with the mobile cowl and extends facing a rear part of one of the openwork regions of the frame, and a raised position, in which each outer flap is tilted to extend its front edge radially outwards and to free the rear part of the one of the openwork regions of the frame; and
    the nacelle further comprising, for each outer flap, an electric motor for moving the outer flap from the lowered position to the raised position and vice versa.

2. The turbofan according to claim 1, comprising at least one deflector attached to the frame and arranged across one of the openwork regions of the frame.

3. An aircraft comprising at least one turbofan according to claim 1.

* * * * *